United States Patent
Flammer, III

(10) Patent No.: US 10,499,359 B2
(45) Date of Patent: Dec. 3, 2019

(54) NETWORK INTERFACE FEATURE TO APPROPRIATELY CONFIGURE FOR REGULATIONS AT NEW LOCATION

(71) Applicant: SILVER SPRING NETWORKS, INC., San Jose, CA (US)

(72) Inventor: George G. Flammer, III, San Jose, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 0 days.

(21) Appl. No.: 15/570,806

(22) PCT Filed: Apr. 29, 2016

(86) PCT No.: PCT/US2016/029928
§ 371 (c)(1),
(2) Date: Oct. 31, 2017

(87) PCT Pub. No.: WO2016/178937
PCT Pub. Date: Nov. 10, 2016

(65) Prior Publication Data
US 2018/0160391 A1   Jun. 7, 2018

Related U.S. Application Data

(60) Provisional application No. 62/155,694, filed on May 1, 2015.

(51) Int. Cl.
*H04L 12/24*   (2006.01)
*H04W 48/10*   (2009.01)
(Continued)

(52) U.S. Cl.
CPC ....... *H04W 64/003* (2013.01); *H04L 41/0833* (2013.01); *H04L 41/0886* (2013.01);
(Continued)

(58) Field of Classification Search
CPC .. H04L 41/0833; H04W 24/02; H04W 48/10; H04W 48/12; H04W 64/003; H04W 8/005
See application file for complete search history.

(56) References Cited

U.S. PATENT DOCUMENTS

| 2004/0003311 A1* | 1/2004 | Jones | G06F 1/3203 |
| | | | 713/320 |
| 2004/0203365 A1* | 10/2004 | Yamamoto | H04B 5/02 |
| | | | 455/41.2 |

(Continued)

FOREIGN PATENT DOCUMENTS

| EP | 1 763 266 A1 | 3/2007 |
| EP | 2 046 084 A1 | 4/2009 |

OTHER PUBLICATIONS

International Search Report (PCT/ISA/210) dated Jul. 18, 2016, by the European Patent Office as the International Searching Authority for International Application No. PCT/US2016/029928.

(Continued)

*Primary Examiner* — Gbemileke J Onamuti

(57) ABSTRACT

A method for determining configuration of a communication device includes: storing, in a memory of the communication device, a plurality of configuration schemes, wherein each configuration scheme is associated with a geographic location; receiving, at the communication device, a data message from a first communicating device, wherein the data message indicates a first geographic location; identifying, in the memory of the communication device, a first configuration scheme associated with the first geographic location; and transmitting, by the communication device, a data transmission using the first configuration scheme.

18 Claims, 5 Drawing Sheets

(51) Int. Cl.
*H04W 24/02* (2009.01)
*H04W 8/00* (2009.01)
*H04W 64/00* (2009.01)
*H04W 48/12* (2009.01)
*H04W 84/18* (2009.01)

(52) U.S. Cl.
CPC ........... *H04W 8/005* (2013.01); *H04W 24/02* (2013.01); *H04W 48/10* (2013.01); *H04W 48/12* (2013.01); *H04W 64/00* (2013.01); *H04W 84/18* (2013.01)

(56) References Cited

U.S. PATENT DOCUMENTS

| 2007/0082699 | A1  | 4/2007 | Karaoguz et al. |
| 2009/0052436 | A1* | 2/2009 | Kotera ................... H04L 12/66 370/352 |
| 2009/0088182 | A1  | 4/2009 | Piersol et al. |
| 2013/0064136 | A1* | 3/2013 | Apostolakis ......... H04W 88/16 370/254 |
| 2014/0031028 | A1  | 1/2014 | Yamada et al. |

OTHER PUBLICATIONS

Written Opinion (PCT/ISA/237) dated Jul. 18, 2016, by the European Patent Office as the International Searching Authority for International Application No. PCT/US2016/029928.

* cited by examiner

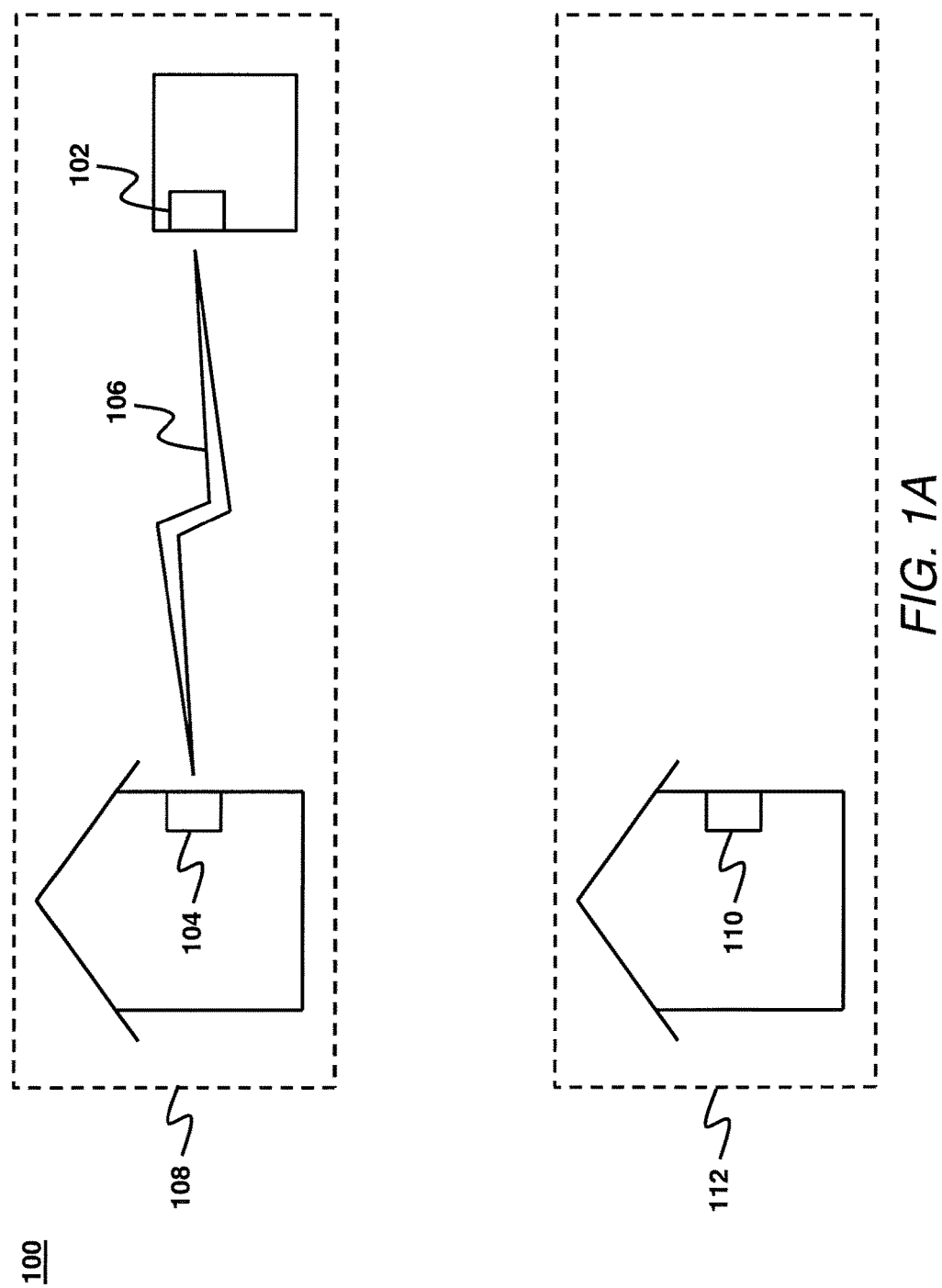

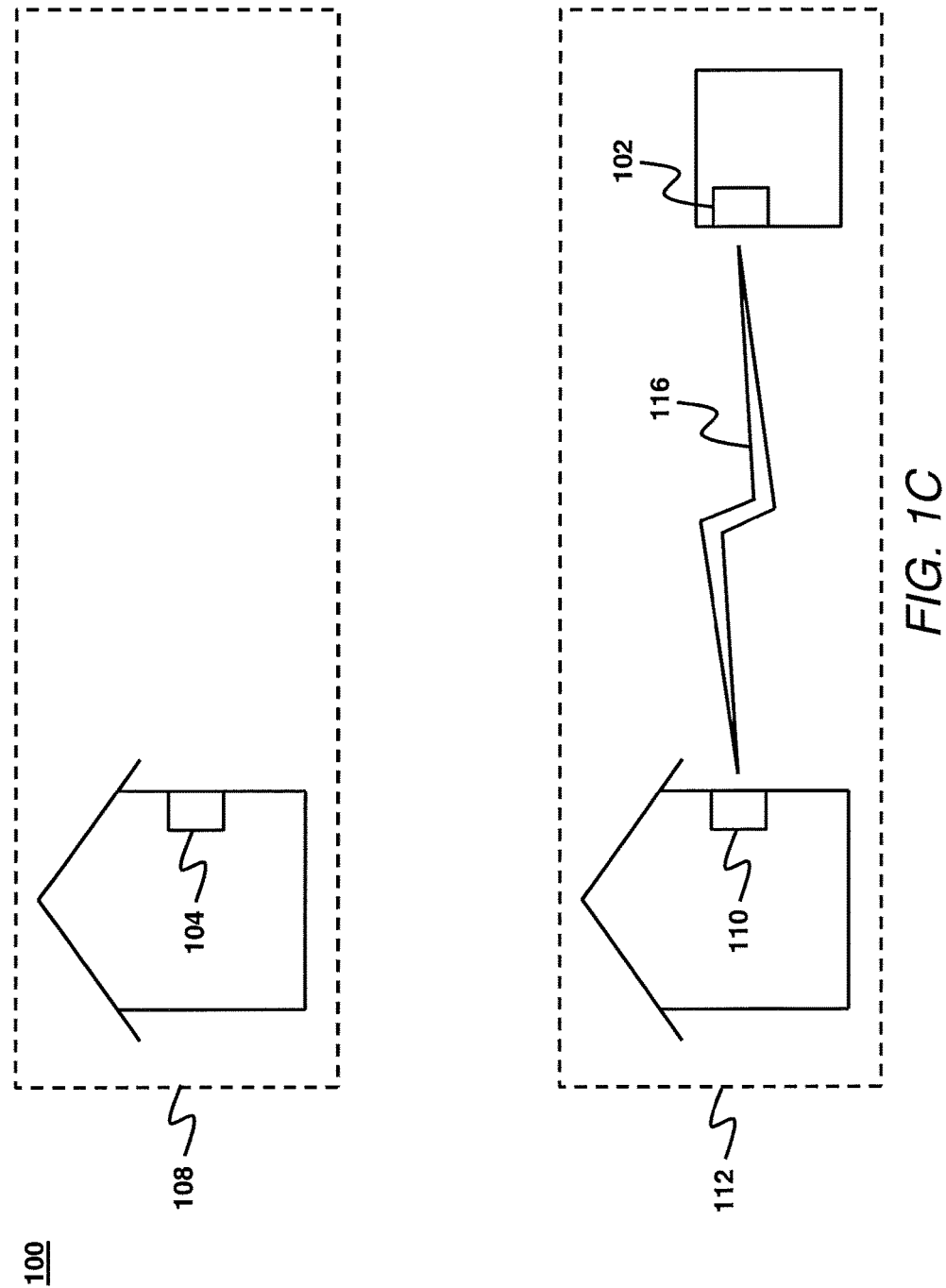

NETWORK INTERFACE FEATURE TO APPROPRIATELY CONFIGURE FOR REGULATIONS AT NEW LOCATION

RELATED APPLICATIONS

The present disclosure claims priority to U.S. Provisional Patent Application No. 62/155,694, entitled "Millinic Feature to Appropriately Configure for Regulations at New Location," filed May 1, 2015, by George Flammer, III, which is herein incorporated by reference in its entirety.

FIELD

The present disclosure relates to the reconfiguration of a communication device, specifically the automatic reconfiguration of broadcast transmission parameters of a communication device based on the geographic location of the communication device as indicated by other communicating devices in geographic proximity.

BACKGROUND

Communication devices are used throughout the world for a nearly endless array of purposes. Communication devices, such as network interface cards, communicate with a network through any number of communication methods to transmit and/or receive data. Network interface cards and other such communication devices can be found in large, complex computing devices, such as smart phones, desktop computers, or supercomputers, as well as in some of the smallest, simplest electronic devices, such as in electronic tracking devices. In one example, radio frequency identification (RFID) tags are communication devices often used in the shipping and transportation industry, placed on an object to track the movement of the object (e.g., containers, pallets, and goods) as they are transported from one location to another.

In some instances, a communication device that is installed on or comprises part of an object may be used to track the movement of an object from one geographic location to another. The communication device may be in communication with readers, network access points, or other such communicating equipment in the starting location and then at the destination location, with the location of the communication device, and the associated object, identified accordingly. In many cases, the communication device may use wireless transmissions to communicate with local communicating equipment due to the speed and convenience of such communications, particularly in instances where hundreds or even thousands of communication devices may be passing in and out of a geographic location, such as a shipping port.

In many systems, in order for a communication device, and thus its associated object, to be identified when moving from one geographic location to another, the communication device continuously broadcasts a transmission. Once the communication device has arrived at a new geographic location, a communicating device there can pick up the transmission and identify the device and its associated object accordingly. However, such a system is only beneficial when the communication device is moved between communicating devices that communicate using the same configuration scheme. If the communication device is moved between communicating device using different configuration schemes, the broadcast transmission by the communication device may not be received by the second communicating device, and, in some instances, may even be illegal in the new geographic area. For example, many countries set specific rules and regulations on wireless transmissions, which may be broken by a communication device that does not adjust the configuration scheme for wireless transmissions upon movement from one country to another.

However, communication devices are often unable to identify their geographic location. In many instances, a communication device and its associated electronic device may be modified to self-identify a geographic location. However, such modification may be expensive due to the number of communication devices and necessary hardware, difficult to implement due to the number of communication devices and constantly changing location, and may adversely affect the life and/or size of the communication device due to the significant power required to operate such modified devices, which can in turn adversely affect the usage of the communication device. Thus, there is a need for a technical solution for the smart configuration of communication devices to accommodate for regulations at a new geographic location, without the need for self-identification by the communication devices and with minimal modification to existing communication infrastructures.

SUMMARY

The present disclosure provides a description of systems and methods for automatic configuration of a communication device in accordance with its geographic location. The present disclosure utilizes data messages from access points in geographic locations where a communication device may travel that include information indication or otherwise associated with the geographic location and/or its configuration regulations, where the communication device can await receipt of such data messages and, once one is received, operate using a configuration scheme to satisfy the regulations for the current geographic location.

A method for configuring a communication device includes: storing, in a memory of the communication device, a plurality of configuration schemes, wherein each configuration scheme is associated with a geographic location; receiving, at the communication device, a data message from a first communicating device, wherein the data message indicates a first geographic location; identifying, in the memory of the communication device, a first configuration scheme associated with the first geographic location; and transmitting, by the communication device, a data transmission using the first configuration scheme.

A communication device includes: a memory configured to store a plurality of configuration schemes, wherein each configuration scheme is associated with a geographic location; a receiving module configured to receive a data message from a first communicating device, wherein the data message indicates a first geographic location; a processing module configured to identify, in the memory of the communication device, a first configuration scheme associated with the first geographic location; and a transmitting module configured to transmit a data transmission using the first configuration scheme.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 1A, 1B, and 1C are a block diagram illustrating a system for the operation of a communication device consistent with regulations at a new geographic location in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Appropriate Configuration of a Communication Device

Figure 1B:
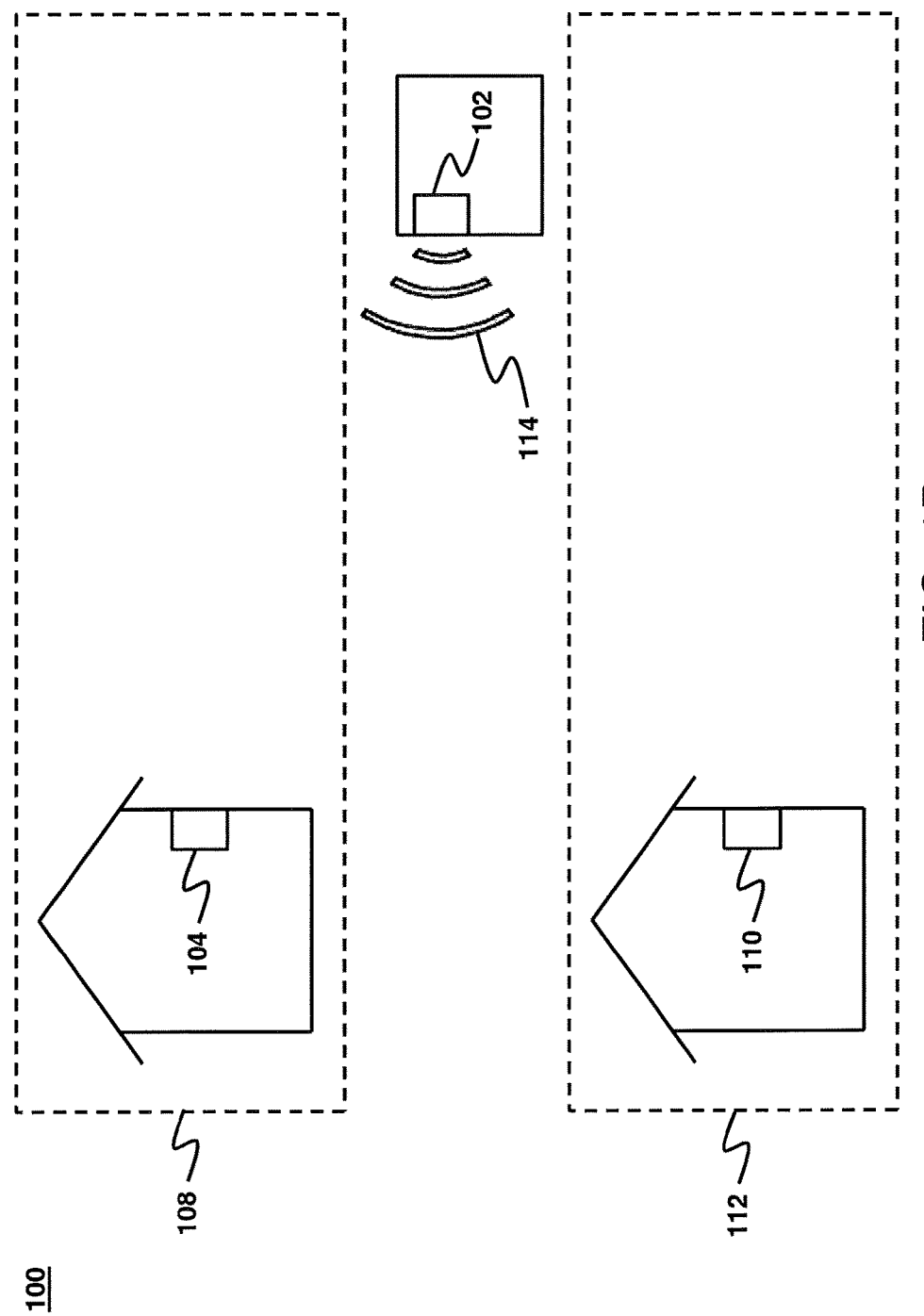

FIGS. 1A, 1B, and 1C illustrate a system 100 for the configuration of a communication device 102 based on local regulations as the communication device 102 moves through geographic locations with varying regulatory schemes.

The communication device 102, discussed in more detail below, may be configured to electronically transmit broadcast, unicast, or other types of data messages that may be received by communicating equipment within range of the data transmission and configured for reception thereof. In illustrative embodiments described herein, access points of a network are presented as an example of equipment that communicates with the communication device 102. It will be appreciated, however, that practical implementations of the concepts described herein are not limited to use of this type of equipment, and are equally applicable to other types of equipment that are configured to exchange data with the communication device 102.

The communication device 102 may be configured to electronically transmit the data messages using a configuration scheme that satisfies regulations applicable to the geographic area in which the communication device 102 is located. The communication device 102 may be further configured to change the configuration scheme if the communication device 102 is moved to a new geographic area in which different regulations apply.

As illustrated in FIG. 1A, the communication device 102 may make a data transmission 106 to a first access point 104. The data transmission 106 may be a broadcast, unicast, or other suitable data transmission made using a configuration scheme associated with a first geographic area 108 in which the communication device 102 and the first access point 104 are located. The configuration scheme may be used to dictate one or more aspects of the data transmission 106 to ensure compliance with one or more regulations associated with the first geographic area 108. The configuration scheme may, for example, specify a transmission frequency and/or power level, or ranges thereof, that the data transmission 106 must comply with. The regulations may be set forth by a regulatory agency or other entity associated with the first geographic area 108. For example, the first geographic area 108 may be a country, such as the United States, and the regulations may be set by a governmental agency, such as the Federal Communications Commission (FCC). In such an example, the communication device 102 may ensure that the broadcast transmission 106 is in compliance with the regulations set forth by the FCC.

In exemplary embodiments, the communication device 102 may be moved from the first geographic area 108 to a second geographic area 112. The second geographic area 112 may have a different regulatory scheme associated therewith. For instance, in the above example, the second geographic area 112 may be the United Kingdom where the regulations may be set by the Office of Communications (OFCOM). The regulations set by the OFCOM may be different than those set by the FCC, which may make the data transmission 106 unsuitable for transmission in the second geographic area 112. The communication device 102 may be configured to identify the change in communication parameters between the first geographic area 108 and the second geographic area 112 via the first access point 104 and a second access point 110, respectively.

As illustrated in FIG. 1B, the communication device 102 may leave the first geographic area 108. For example, the communication device 102 may be attached to a container that is loaded onto a cargo ship that departs a port in the United States as the first geographic area 108 for traveling to the United Kingdom as the second geographic area 112. In such an example, the location of the communication device 102 illustrated in FIG. 1B may be during the voyage across the ocean during which the communication device 102 is outside of both geographic areas 108 and 112 and not in communication with either access point 104 or 110.

The communication device 102 may be configured to detect when communication with the first access point 104 is lost. The detection may be based on the lack of receipt of a data message being electronically transmitted by the first access point 104. When communication is lost with the first access point 104, the communication device 102 may begin to scan 114 for, or be otherwise available for receipt of, broadcast messages or other suitable types of data messages transmitted by any access point. The communication device 102 may continue to scan 114 until a broadcast or other type of data message is received from an access point. The scan 114 may be a periodic scan, where the period may be based on any number of suitable criteria as may be set by any associated entity. For example, the period may be set by an owner of the network interface card, an owner of the access points 104 and 110 or an associated network, an owner of the object (e.g., the container) associated with the communication device 102, or an owner or operator of the transportation method (e.g., the cargo ship) used to transport the communication device 102. Criteria used in the setting of the period may be based on the length of the journey, available battery life of the communication device 102, rules and regulations of encountered geographic areas, etc. For instance, in one example, the manufacturer of the communication device 102 may set a period of one hour for execution of the scan 114. In some embodiments, the communication device 102 may be in a dormant mode (e.g., "sleep") and may be awoken or otherwise activated by receipt of a broadcast transmission from an access point.

In some embodiments, the scan 114 may scan predetermined sets of channels, data rates, and modulations for receipt of a broadcast message from an access point, where each set is associated with a regulatory domain. In such embodiments, the predetermined sets of channels, data rates, and modulations may be such that the communication device 102 may be configured to receive a broadcast message from an access point in any geographic area that the communication device 102 may enter or may need to communicate in. In such an embodiment, the predetermined sets of channels, data rates, and modulations may be based on the rules or regulations in each of the respective geographic areas. For instance, in the example illustrated in FIGS. 1A, 1B, and 1C, the scan 114 may utilize the channels, data rates, and modulations associated with both the first geographic area 108 and the second geographic area 112. The communication device 102 may be configured to continue executing the scan 114 or otherwise being available for receipt of broadcast messages until a broadcast message is received from an access point. In some instances, the scan 114 by the communication device 102 may include electronic data transmissions for receipt by an available, receiving access point, which may be responded to by the access point with a unicast message back to the communication device 102, where the received unicast message may be the goal of the scan 114.

As illustrated in FIG. 1C, the communication device 102 may enter the second geographic area 112. While in the second geographic area 112, the communication device 102 may detect (e.g., via the scan 114) a broadcast message 116 (e.g., or unicast or other type of data message, as applicable, such as discussed above) electronically transmitted by the second access point 110. The broadcast message 116 may include an indication that the communication device 102, being in receipt of the message 116, is located in the second geographic area 112. The communication device 102 may then identify a configuration scheme associated with the second geographic area 112. In some embodiments, configuration schemes may be stored locally in a memory of the communication device 102. In such embodiments, the broadcast message 116 transmitted by the second access point 110 may include an identifier or other identifying information that may be used by the communication device 102 to identify the appropriate configuration scheme stored in the memory. In other embodiments, the broadcast message 116 may include the configuration scheme. For instance, in the above example, the broadcast message 116 may include the configuration scheme for compliance with the regulations set by OFCOM for wireless transmissions in the United Kingdom as the second geographic area 112.

Once the communication device 102 has received and/or identified the configuration scheme, the communication device 102 may begin to electronically transmit data messages itself using the configuration scheme. The second access point 110 or other access point in the second geographic area 112 may then receive the data transmissions of the communication device 102, which would be in compliance with the regulations applicable to the second geographic area 112. As a result, the communication device 102 may be able to ensure that all data transmissions therefrom are compliant with any rules or regulations applicable to where it is currently located, even as the geographic location of the network interface card changes, without the need for updating a communication device 102 to accomplish self-identification of its geographic location, or the constant identification of the geographic location of the communication device 102.

In the above example, the first access point 104 and second access point 110 may each be smart grid devices in a wireless mesh network configured to identify the geographic location of network interface cards 102 for the tracking of movement of containers. As the container on which the communication device 102 is located moved from the United States to the United Kingdom, the first access point 104 may detect that the communication device 102 has left its area of coverage in the United States, and then the second access point 110 may identify that the communication device 102 has entered the United Kingdom upon detection via the broadcast transmission from the communication device 102. It is also noted that the first access point 104 and/or second access point 110 may be devices associated with one or more additional computing networks, or may be computing devices not interfaced with any other network (e.g., additional to a network comprised of the respective access point and the computing device 102), depending on implementation and usage thereof.

Communication Device

Figure 2:
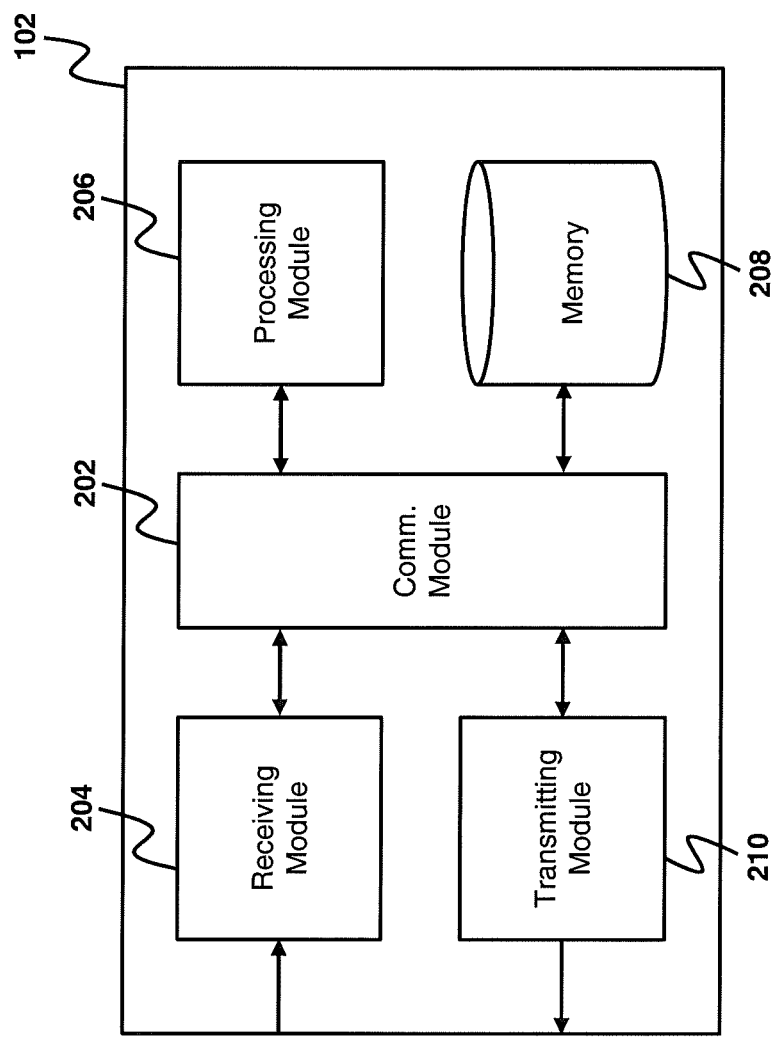
FIG. 2 is a block diagram illustrating the communication device of FIGS. 1A, 1B, and 1C that operates with a configuration based on regulations changes due to changes in geographic location in accordance with exemplary embodiments.

FIG. 2 illustrates an embodiment of the communication device 102 in the system 100 illustrated in FIGS. 1A, 1B, and 1C. It will be apparent to persons having skill in the relevant art that the embodiment of the communication device 102 illustrated in FIG. 2 is provided as illustration only and may not be exhaustive to all possible configurations of the communication device 102 suitable for performing the functions as discussed herein. For example, the communication device 102 may include any number of additional modules, engines, devices, or units for performing the functions discussed herein or additional functions of the communication device 102, such as modules related to the storage, charging, or usage of electrical energy for operation of the communication device 102.

The communication device 102 may include a communication module 202. The communication module 202 may be configured to transmit data between modules, engines, databases, memories, and other components of the communication device 102 for use in performing the functions discussed herein. The communication module 202 may be comprised of one or more communication types and utilize various communication methods for communications within an electronic device. For example, the communication module 202 may be comprised of a bus, contact pin connectors, wires, etc. In some embodiments, the communication module 202 may also be configured to communicate between internal components of the communication device 102 and external components of the communication device 102, such as externally connected databases, display devices, input devices, etc.

The communication device 102 may also include a receiving module 204. The receiving module 204 may be configured to receive data over one or more networks via one or more network protocols. The receiving module 204 may be comprised of one or more antennas, electrical circuits, and other electronic hardware components used to perform the functions of the receiving module 204 as discussed herein. The receiving module 204 may receive electronically transmitted data signals, where data may be superimposed or otherwise encoded on the data signal and decoded, parsed, read, or otherwise obtained via receipt of the data signal by the receiving module 204. In some instances, the receiving module 204 may include a parsing module for parsing the received data signal to obtain the data superimposed thereon. For example, the receiving module 204 may include a parser program configured to receive and transform the received data signal into usable input for the functions performed by the communication device 102 to carry out the methods and systems described herein.

The receiving module 204 may be configured to scan 114 for, or otherwise be available for receipt of, broadcast messages or other types of data messages electronically transmitted by access points or other similar computing devices. The receiving module 204 may perform the scan 114 periodically and may scan sets of channels, data rates, and modulations. The period for scanning and the channels, data rates, modulations, and other specifications for the scanning for broadcast messages may be stored locally in a memory 208 of the communication device 102, discussed in more detail below. Broadcast messages scanned for, and received, by the receiving module 204 from access points may include data indicating a geographic location and/or configuration scheme. The data indicating a geographic location may be data suitable for use by the communication device 102 in identifying a configuration scheme, such as an identification number, country name, regulatory agency name or identifier, etc., or may be data comprising the configuration scheme itself, such as the frequency and rate data associated therewith. In some embodiments, the receiving module 204 may be configured to wake the communication device 102 upon receipt of a suitable broadcast message, such as in instances where the communication device 102 may operate in a low power, sleep, or other type of dormant mode when not in communication with an access point.

The communication device 102 may also include a processing module 206. The processing module 206 may be configured to perform the functions of the communication device 102 discussed herein as will be apparent to persons having skill in the relevant art. In some embodiments, the processing module 206 may include and/or be comprised of a plurality of engines and/or other modules specially configured to perform one or more functions of the communication device 102. The processing module 206 may be comprised of one or more microprocessors or other processing devices, which may include one or more processor cores. The processing module 206 may be configured to identify a configuration scheme for use in electronically transmitting data messages by the communication device 102 based on data received by the receiving module 204 from an access point. For example, the processing module 206 may identify a configuration scheme included in a broadcast message received from an access point by the receiving module 204, or may identify a configuration scheme using data indicating a geographic location included in the received broadcast message. In latter instances, the processing module 206 may be configured to query the memory 208 of the communication device 102 to identify a configuration scheme associated with the indicated geographic location.

The memory 208 may be configured to store data for use by the communication device 102 in performing the functions discussed herein. The memory 208 may be configured to store data using suitable data formatting methods and schema and may be any suitable type of memory, such as read-only memory, random access memory, etc. The memory 208 may include a plurality of configuration schemes, where each configuration scheme may be associated with one or more geographic locations. Each configuration scheme may include specifications for data transmissions made by the communication device 102, such as a transmission frequency and power level and/or ranges thereof. The memory 208 may include, for example, encryption keys and algorithms, communication protocols and standards, data formatting standards and protocols, program code for modules and application programs of the communication device 102, and other data that may be suitable for use by the communication device 102 in the performance of the functions disclosed herein as will be apparent to persons having skill in the relevant art. For instance, in the above example, the memory 208 may store identification data associated with the communication device 102, such as may be suitable for use in tracking movement of an associated object. In some embodiments, the memory 208 may be comprised of or may otherwise include a relational database that utilizes structured query language for the storage, identification, modifying, updating, accessing, etc. of structured data sets stored therein.

The communication device 102 may also include a transmitting module 210. The transmitting module 210 may be configured to electronically transmit data over one or more networks via one or more network protocols. The transmitting module 210 may be comprised of one or more antennas, electrical circuits, and other electronic hardware components used to perform the functions of the transmitting module 210 as discussed herein. The transmitting module 210 may electronically transmit data signals, where data may be superimposed or otherwise encoded on the data signal for receipt by an external computing device, such as an external access point. In some instances, the transmitting module 210 may include one or more modules for superimposing, encoding, or otherwise formatting data into data signals suitable for transmission.

The transmitting module 210 may be configured to electronically transmit broadcast, unicast, or other suitable types of data messages using one of a plurality of different configuration schemes. The configuration scheme for use in electronically transmitting a data message may be identified by the processing module 206 and read from the memory 208 or a broadcast message received by the receiving module 204 from an access point. The transmitting module 210 may be configured to electronically transmit a data message using a single configuration scheme, and may be configured to change the configuration scheme as the geographic location of the communication device 102 changes to a new geographic location where such a change may be required by applicable rules or regulations. In some embodiments, the transmitting module 210 may be configured to repeat a data transmission periodically (e.g., to inform access points of the communication device's presence and location) and may cease the transmission once the communication device 102 has left a geographic area, as may be identified by the processing module 206 once no broadcast messages are received from an access point.

Process for Configuration of a Communication Device

Figure 3:
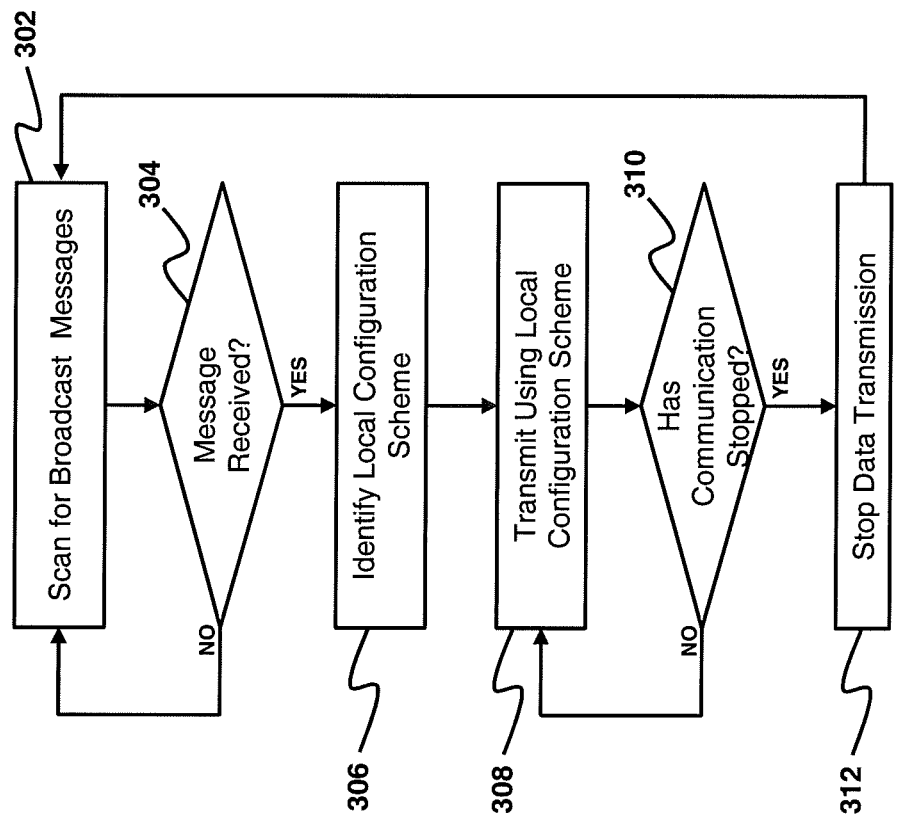
FIG. 3 is a flow diagram illustrating a process for ensuring proper local operation of the communication device of FIG. 2 for upon changes in geographic location in accordance with exemplary embodiments.

FIG. 3 illustrates a process 300 for the selective configuration of the communication device 102 of the system 100 due to changes necessitated by a change in geographic location.

In step 302, the receiving module 204 of the communication device 102 may execute a scan 114 for, or may make itself otherwise available for receipt of, broadcast messages or other types of data messages that may be electronically transmitted by access points. The scan 114 may scan sets of channels, data rates, and modulations that may be used by an access point that may be encountered by the communication device 102. In some embodiments, the scan 114 may be limited to only those channels, data rates, and modulations that may be used by the communication device 102 in future communications. In other embodiments, the scan 114 may include additional channels, data rates, and modulations. In some cases, the scan 114 may be iterative. For instance, the receiving module 204 may scan 114 each of the sets of channels, data rates, and modulations in a sequence, which may start at the last-known configuration scheme and proceed in a predefined (e.g., based on geographic area associations) order. In other cases, the scan 114 may be simultaneous. For instance, the receiving module 204 or processing module 206 may include a digital signal processor configured to scan 114 multiple sets of channels, data rates, and modulations simultaneously to identify the receipt of a broadcast message.

In step 304, the processing module 206 of the communication device 102 or other suitable module or engine thereof may determine if a decodable broadcast message has been received by the receiving module 204. If no message has been received, then the process 300 may return to step 302 and await the receipt of a broadcast message. If a broadcast message is received, then the process 300 may proceed to step 306. In step 306, the processing module 206 of the network interface card may identify a local configuration scheme for the geographic area in which the network interface card is located. The local configuration scheme may be identified based on transmission parameters of the decodable message and/or data included in the received broadcast message. In one embodiment, the broadcast message may include data indicating a geographic location, which may be used by the processing module 206 to identify a configuration scheme stored in the memory 208 of the communication device 102. In another embodiment, the data indicating the geographic location included in the broadcast message may include the configuration scheme, which may be identified therefrom via the processing module 206. The configuration scheme may include specifications to be used in the transmission of a data message, such as a transmission frequency and power level.

In step 308, the transmitting module 210 of the communication device 102 may electronically transmit a data message using the identified configuration scheme. In step 310, the processing module 206 may determine if communications with the access point have stopped. If the communications have not stopped (e.g., the access point is continuing to send the message), then the process 300 may remain at step 308 where the transmitting module 210 continues to electronically transmit data messages according to the local configuration scheme. If the communications have stopped, such as due to movement of the communication device 102 out of range of the access point, then the process 300 may proceed to step 312.

In step 312, the transmitting module 210 of the communication device 102 may stop the data transmission. Once the data transmission is stopped, the process 300 may return to step 302, where the receiving module 204 may start to scan 114 again for new messages from access points and continue the process 300. In doing so, the communication device 102 may be in a "listening" mode by scanning 114 for or otherwise being available for receiving access point transmissions when out of range of any suitable access points, and may switch to a "transmitting" mode when an access point is encountered, as identified by receipt of an access point transmission. The data transmission may be made using a configuration scheme suitable for the local geographic area, as identified via the access point transmission, to ensure compliance of the broadcasts by the communication device 102 with any local rules or regulations.

Techniques consistent with the present disclosure provide, among other features, systems and methods for selective configuration of a communication device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for determining configuration of a communication device, comprising:
   storing, in a memory of the communication device, a plurality of configuration schemes, wherein each configuration scheme is associated with a geographic location;
   receiving, at the communication device, a data message from a first communicating device, wherein the data message indicates a first geographic location;
   identifying, in the memory of the communication device, a first configuration scheme associated with the first geographic location;
   transmitting, by the communication device, a data transmission using the first configuration scheme; and
   identifying, by the communication device, loss of the data message from the first communicating device, wherein the communication device is configured to cease transmitting the data transmission and operate in a low power mode upon loss of the data message from the first communicating device.

2. The method of claim 1, further comprising:
   receiving, at the communication device, a data message from a second communicating device, wherein the data message indicates a second geographic location;
   identifying, in the memory of the communication device, a second configuration scheme associated with the second geographic location; and
   transmitting, by the communication device, the data transmission using the second configuration scheme.

3. The method of claim 1, further comprising:
   scanning, at the communication device, predetermined sets of communication channels for the data message from the first communicating device.

4. The method of claim 1, wherein the data message is a wirelessly transmitted message.

5. The method of claim 1, wherein the data transmission is wirelessly transmitted.

6. The method of claim 1, wherein the communicating device is a smart grid device included in a wireless mesh network.

7. The method of claim 1, wherein the configuration scheme includes at least one of: frequency and power level.

8. The method of claim 1, wherein the data message is a broadcast message.

9. A communication device, comprising:
   a memory configured to store a plurality of configuration schemes, wherein each configuration scheme is associated with a geographic location;
   a receiving module configured to receive a data message from a first communicating device, wherein the data message indicates a first geographic location;
   a processing module configured to identify, in the memory of the communication device, a first configuration scheme associated with the first geographic location; and
   a transmitting module configured to transmit a data transmission using the first configuration scheme, wherein
   the processing module is further configured to identify loss of the data message from the first communicating device, and
   the transmitting module is further configured to cease transmitting the data transmission and operate in a low power mode upon loss of the data message from the first communicating device.

10. The system of claim 9, wherein
the receiving module is further configured to receive a data message from a second communicating device, wherein the data message indicates a second geographic location;
the processing module is further configured to identify, in the memory of the communication device, a second configuration scheme associated with the second geographic location, and
the transmitting module is further configured to transmit the data transmission using the second configuration scheme.

11. The system of claim 9, wherein the communication device is further configured to scan predetermined sets of communication channels for the data message from the first communicating device.

12. The system of claim 9, wherein the data message is a wirelessly transmitted message.

13. The system of claim 9, wherein the data transmission is wirelessly transmitted.

14. The system of claim 9, wherein the first communication device is a smart grid device included in a wireless mesh network.

15. The system of claim 9, wherein the configuration scheme includes at least one of: frequency and power level.

16. The system of claim 9, wherein the data message is a broadcast message.

17. The method of claim 2, wherein the communication device is configured to discontinue low power mode and return to normal operation upon receipt of the data message from the second communicating device.

18. The system of claim 10, wherein the communication device is configured to discontinue low power mode and return to normal operation upon receipt of the data message from the second communicating device.

* * * * *